United States Patent [19]

Mitsuhashi

[11] Patent Number: 5,101,309

[45] Date of Patent: Mar. 31, 1992

[54] APPARATUS FOR AUTOMATICALLY OPTIMIZING MAGNETIC RECORDING AND PLAYBACK

[75] Inventor: Yasuo Mitsuhashi, Nagaokakyo, Japan

[73] Assignee: Mitsubishi Denki Kabushiki Kaisha, Tokyo, Japan

[21] Appl. No.: 390,370

[22] Filed: Aug. 7, 1989

[30] Foreign Application Priority Data

Aug. 23, 1988 [JP] Japan .............................. 63-208978
Nov. 24, 1988 [JP] Japan .............................. 63-296523

[51] Int. Cl.⁵ .............................................. G11B 5/02
[52] U.S. Cl. ......................................... 360/68; 360/31
[58] Field of Search ..................... 360/31, 65, 68, 107, 360/108, 109

[56] References Cited

U.S. PATENT DOCUMENTS

| | | | |
|---|---|---|---|
| 4,151,569 | 4/1979 | Hathaway | 360/109 |
| 4,151,570 | 4/1979 | Ravizza et al. | 360/109 |
| 4,337,492 | 6/1982 | Brookhart et al. | 360/109 |
| 4,831,466 | 3/1989 | Murakami et al. | 360/31 |
| 4,882,635 | 11/1989 | Sanai | 360/109 |

FOREIGN PATENT DOCUMENTS

| | | |
|---|---|---|
| 0128577 | 12/1984 | European Pat. Off. . |
| 0052510 | 4/1980 | Japan ........................... 360/31 |
| 0062805 | 4/1983 | Japan ........................... 360/31 |
| 63-67253 | 12/1988 | Japan . |
| 2072926 | 10/1981 | United Kingdom .................. 360/31 |
| 2111291 | 6/1983 | United Kingdom . |

Primary Examiner—David J. Severin

[57] ABSTRACT

While prior art apparatus for magnetic recording and playback (VTRs) were unable to perform magnetic recording of an FM signal with an optimum recording current responding to change of the optimum recording current dependent on kinds of magnetic tapes used and wear of heads, the magnetic recording of an FM signal with the optimum recording current at all times has been made possible by having a recorded signal along a track of a magnetic tape read by a level servo head scanning the track following the signal recording and having the recording current controlled to be optimized by use of a recording current controlling device based on the playback signal output from the level servo head. As a result, improvement of the S/N ratio and automatic adjustment of the recording current can be achieved. Further, by means of a head drive unit, the position of the level servo head is finely adjusted so that the control for optimization of the recording current is performed accurately.

15 Claims, 10 Drawing Sheets

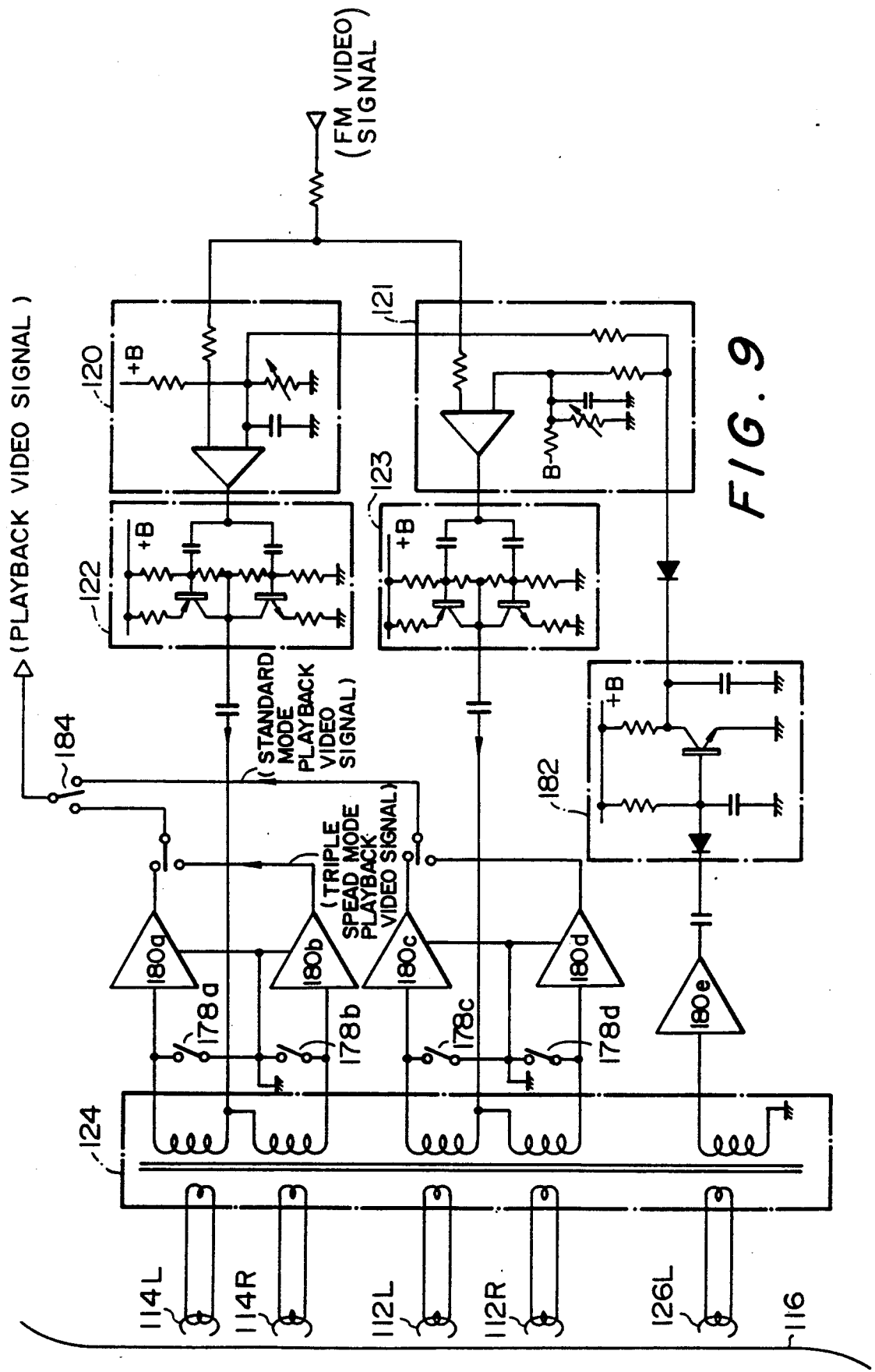

APPARATUS FOR AUTOMATICALLY OPTIMIZING MAGNETIC RECORDING AND PLAYBACK

BACKGROUND OF THE INVENTION

1. Field of the Invention

The present invention relates to a helical scan type apparatus for magnetic recording and playback (hereinafter to be called "VTR") capable of automatically controlling the recording current to thereby optimize it when performing a recording operation.

2. Description of the Prior Art

In VTRs hitherto in use there are types provided with a plurality of magnetic heads (hereinafter to be called "heads"). In an ordinary recording/playback mode (hereinafter to be called "standard mode") with such a VTR, two heads disposed on the peripheral portion of a rotating drum symmetrically about the axis of rotation of the rotating drum are used. In special playback modes such as still picture mode, slow motion mode, and speed search mode, other heads similarly disposed on the rotating drum are used in the respective modes.

FIG. 12 is a drawing showing a head arrangement on a rotating drum in a prior art VTR, in which the head arrangement viewed along the direction of the axis of rotation of the rotating drum is shown. Referring to the drawing, there are disposed on the periphery of the rotating drum 10 rotating around its axis an L-azimuth head 12L for a standard mode and an R-azimuth head 14R for a triple speed mode, both the heads being formed on a single base. The distance between these heads 12L and 14R, a so-called head gap, is 740 μm, for example. Also, an R-azimuth head 12R for the standard mode and an L-azimuth head 14L for the triple speed mode are similarly formed on a single base with a head gap of 740 μm therebetween. Such an arrangement of a plurality of heads on a single base has so far been called a multi-head arrangement.

FIG. 13 is a drawing showing the relative positions of the above described four heads in the axial direction of the rotating drum 10, so-called relative heights. In this drawing, the heads are aligned with each other, or more particularly, the center of each of the heads in the direction of the height is arranged in a common straight line, which is shown by a one-dot chain line in the drawing.

FIG. 14 is a drawing showing a record format on a magnetic tape obtained when recording is performed in the standard mode and shows a pattern of video tracks provided by the above described heads 12L and 12R. In this drawing, FM magnetic recording is made along tracks A1, A2 on the magnetic tape 16 by means of the head 12L and FM magnetic recording is made along other tracks B1, B2, by means of the head 12R.

FIG. 15 is a drawing showing the position C of the head in a still picture playback mode. In this case, the head 12L or 14L of the same azimuth is stopped at the position C relative to the magnetic tape 16, whereby still picture playback along the track B1 is performed.

FIG. 16 is a circuit diagram of a recording system performing recording in the standard mode by the use of the heads 12L and 12R, in which a level adjuster 18 for adjusting a video signal converted into an FM signal to an optimum level is connected through an amplifier 20 to a recording power amplifier 22 in a push-pull configuration. This is, in turn, connected to a rotary transformer 24 for driving the heads 12L and 12R by means of the output of the amplifier 22.

Recording/playback operation of a prior art VTR of the above described structure will be described below.

When a recording/playback operation in the normal mode is performed, the recording/playback operation is performed by corresponding two heads 12R and 12L, 14L and 14R.

When a special playback operation in such a mode as still picture, slow motion, and speed search mode is performed, the recording/playback operation is performed with the four heads successively switched so that there are produced as few noises as possible in the picture. In the case of the still picture playback operation, for example, the track magnetically recorded by the head 12L is scanned by the heads 12L and 14L, as shown in FIG. 15, so that a still picture is continuously played back.

When the heads 12L and 12R are driven at the time of recording, the level of the FM signal recorded on the magnetic tape 16, the so-called recording current, is selected such that the maximum playback output, namely, optimum efficiency, is obtained by each head 12L, 12R. A playback output-recording current characteristic is shown in FIG. 17. More particularly, the recording current supplied to the heads 12L, 12R at the time of recording is selected to be $I_{REC}$ in FIG. 17, the optimum recording current corresponding to the maximum playback output. Hence, the playback output is maximized and the S/N ratio is improved. The optimum recording current $I_{REC}$ can be obtained by previously adjusting the level adjuster 18 in FIG. 16 according to the property of the magnetic tape 16 and the head characteristics.

Since the prior art VTR was arranged as described above, the recording current for driving the heads at the time of recording was fixed by initial setting, and therefore, there were problems as follows.

That is, since the above described optimum recording current differs with the kind of the magnetic tape, when a magnetic tape with an optimum recording current $I_{REC}$ different from the initially set recording current is loaded on a VTR, the maximum output is not always obtained. Since provision of a high S/N ratio is required of a VTR, in particular, for recording and playing back a high quality picture, there has been a great demand, to attain an improved S/N ratio to meet the requirement for the technology to control the recording current so that the recording current is always brought into agreement with the optimum recording current $I_{REC}$.

When the gap depth (Gd) has become shallow as a result of development of wear on the heads, the characteristics of the heads may change. This leads to a change in the optimum recording current $I_{REC}$ compared with that before occurrence of the wear even with the same kind of the magnetic tape. Hence, it is referred that the setting of the recording current is adjusted again for a head which has been used for as long as, for example, 1,000 hours or more (with a ferrite head used in a VHS system, wear of 8 μm or so develops in 1,000 hours of use).

SUMMARY OF THE INVENTION

The present invention was made to solve the above described problems and an object of this invention is to provide a VTR capable of recording a signal, at all times, with an optimum recording current automatically adjusted depending on the kind of a recording tape and the degree of wear of the heads.

In order to achieve the above mentioned object, the present invention is provided, in addition to those heads, i.e., video heads, disposed on a rotating drum for performing magnetic recording of an FM signal on a magnetic tape, with a level servo head disposed on the periphery of the rotating drum for playing back a signal related with the magnetic recording in synchronism with the magnetic recording. It is further provided with a recording current controlling means responsive to the level of the playback signal obtained by means of the level servo head for controlling the recording current supplied to the video head such that the aforesaid playback signal level may be maximized.

According to the level servo head and the recording current controlling means, the magnetic recording is performed with an optimum recording current such that level of the signal upon playing back is maximized. In addition, the magnetic recording is controlled such that the recording current is automatically brought into agreement at all times with an optimum recording current depending on the kind of the magnetic tape used and the degree of wear of the heads. Therefore, improvement in the S/N ratio and automatic adjustments of the recording current can be achieved.

As recording current controlling means characteristic of the present invention, there is an arrangement for controlling gain of recording amplifiers for amplifying the recording currents supplied to the video heads. More particularly, while recording currents amplified by the recording amplifiers are supplied to the video heads, the gain of the recording amplifiers is controlled based on the level of the playback signal by the level servo head. That is, the level of the playback signal produced by the level servo head is first detected by the recording current controlling means and when the level of the playback signal is low, the gain of the recording amplifiers is adjusted. Then, the level of the playback signal is detected again, and similar gain adjustment is performed. Thus, these gain adjustments are carried out in succession.

According to such a recording current controlling means for controlling the gain of the recording amplifiers, the recording current for recording on the magnetic tape is controlled so as to agree with the optimum recording current depending on the kind of the magnetic tape and the degree of the wear of the heads.

The disposed position of the level servo head on the rotating drum characteristic of the present invention is such a position which is a predetermined distance offset from the video head arrangement the offset here means the difference between positions in the axial direction of the rotating drum.

By such an offset arrangement of the level servo head, the same is enabled to scan the track magnetically recorded by the video head in a manner to follow after the video head.

Concerning the disposed position of the level servo head on the rotating drum, the arrangement of the level servo head shifted a predetermined angle from the video head along the circumference of the rotating drum is significant in addition to the aforesaid offset arrangement. In this arrangement, the level servo head characteristic of the present invention is disposed at the position a predetermined angle shifted from the video head along the circumference of the rotating drum and further offset a distance corresponding to that angle in the axial direction of the rotating drum.

According to such an arrangement of the level servo head, the offset is determined depending on the aforesaid angle. Thereby, the level servo head is enabled to scan the track magnetically recorded by the video head.

The level servo head can also be formed integral with the video head. In this case, the level servo head is disposed without considering the above described angle and offset, but just disposed adjoining the video head.

Such an integral formation of the level servo head and video head makes intensification of the function of the heads achievable.

It is also possible to provide a plurality of such level servo heads so that these may confront plural tracks corresponding to plural recording channels. In such a case, the above described recording current control can be performed for the respective tracks corresponding to the plural channels.

A plurality of the level servo heads can also be provided so that they support plural recording/playback operations such as standard mode and still picture mode. In this case, the above described recording current controlling characteristic of the present invention can be performed for each of the plural recording/playback modes.

Further, the level servo head is provided with a head drive unit for a fine adjustment of the position in the axial direction of the rotating drum of the level servo head where it confronts the magnetic tape.

According to the head drive unit, it is made possible for the level servo head to scan the track with the error of the aforesaid confronting position suppressed, so that a playback error produced by the level servo head can be suppressed.

Further, the head drive unit comprises a support spring for supporting the level servo head for vertical oscillation and a head driving actuator for driving the support spring. Here, the head driving actuator includes a movable member supported by the supporting spring and a fixed member fixed to a frame of the head drive unit. When the head driving actuator is activated and thereby the movable member is moved, the supporting spring supporting the same is oscillated and thereby the level servo head is oscillated.

By means of the head drive unit as arranged above, the Playback error resulting from the scanning operation of the level servo head can be easily controlled.

The supporting spring is a disk type spring, i.e., a circular spring, having slits in a predetermined pattern made therein. Further, by the use of a number of the same, the movable member of the head drive unit is supported for vertical oscillation.

Therefore, it is made possible to keep the direction of the oscillation of the level servo head fixed in one direction and to permit the level servo head to face the magnetic tape at a suitable angle.

Further, the head driving current supplied to the head drive unit for oscillating the level servo head is a current determined depending on the detected position of the level servo head. Therefore, the level servo head can be brought automatically into a position aligned with the track.

BRIEF DESCRIPTION OF THE DRAWINGS

FIGS. 3(a) and 3(b) are sectional views showing structure of the head drive unit 128 shown in FIG. 2, of which FIG. 3(a) is a partly sectional perspective view and FIG. 3(b) is a longitudinal sectional view. In these drawings, the level servo head 126L, characteristic of the present invention, is supported for vertical oscillation by means of two circular springs 138, 140 and a hollow bobbin 142 having a coil 144 wound around the same and fixedly supported by the springs.

FIGS. 4(a) and 4(b) are plan views showing structure of the circular springs 138, 140 shown in FIG. 3, of which FIG. 4(a) shows a circular spring 138 supporting the level servo head 126L and FIG. 4(b) shows another circular spring 140. To the inner edges of these circular springs 138, 140 shown in the drawings, the hollow bobbin 142 with the coil 144 wound around the same is fixed, and the level servo head 126L is permitted to oscillate along with the movement of the hollow bobbin 142 having thereon, by means of the springs 138, 140 whose resiliency is made suitable by making slits in arched patterns therein.

FIG. 8(a) is the relative positional drawing at supplying timing of the head 112R. FIG. 8(b) is the relative positional drawing at takeup timing of the head 112R.

FIG. 9 is circuit diagram showing a recording current controlling circuit characteristic of the present invention together with a recording/playback circuit for achieving recording playback on the magnetic tape 116, in which the gain of gain control amplifiers 120, 121 is controlled depending on the level of the playback signal produced by the level servo head 126L so that the recording current is controlled to agree with an optimum recording current $I_{REC}$.

DESCRIPTION OF THE PREFERRED EMBODIMENTS

An embodiment of the present invention will be described below with reference to the accompanying drawings.

Figure 2:
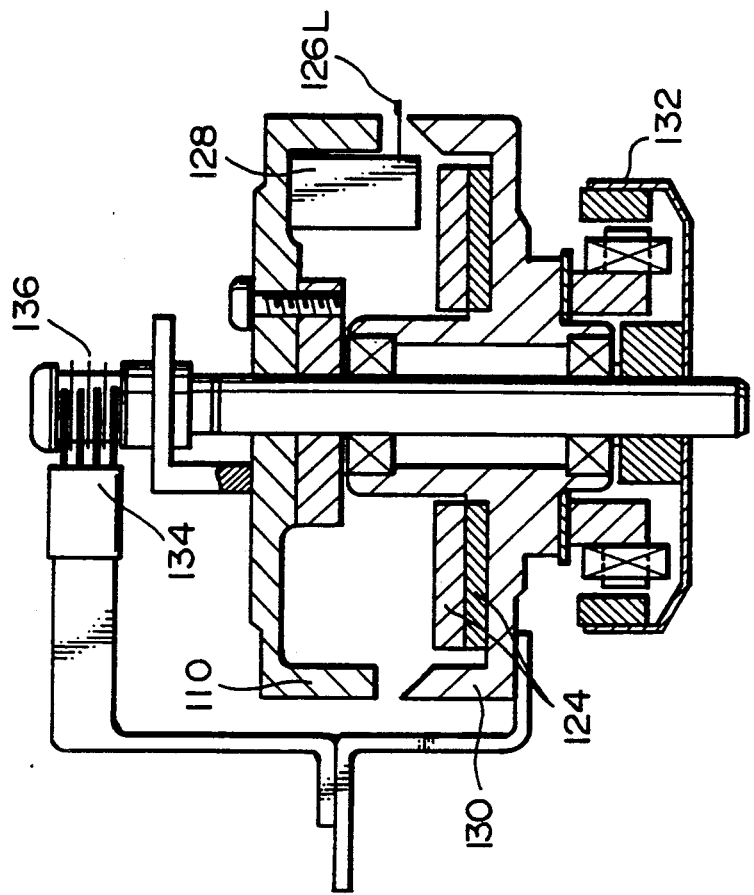
FIG. 2 is a sectional view of the rotating drum 110 taken along one-dot chain line II—II of FIG. 1, in which the level servo head 126L characteristic of the present invention is supported by a head drive unit 128.
Figure 1:
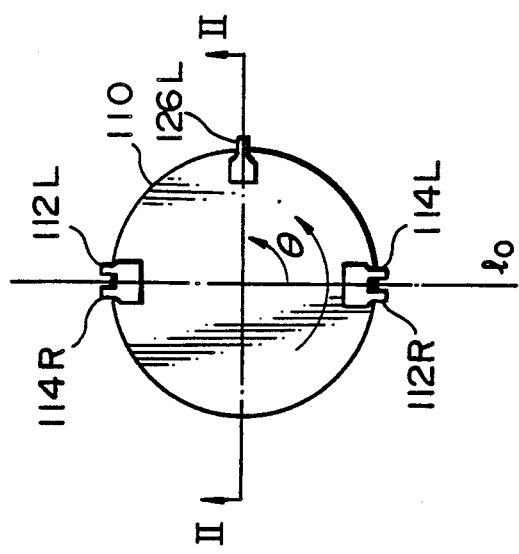
FIG. 1 is a plan view showing arrangement of heads on a rotating drum in a VTR according to a first embodiment of the present invention, in which an arrangement on the periphery of a rotating drum 110 of heads 112L, 112R, 114L, and 114R being the same as the conventional ones and a level servo head 126L characteristic of the present invention is shown.

FIG. 1 is a plan view showing an arrangement of heads on a rotating drum 110 in a VTR according to a first embodiment of the present invention and FIG. 2 is a longitudinal sectional view of the drum 110 taken along line II—II of FIG. 1. Referring to the drawings, an L-azimuth level servo head 126L characteristic of the present invention is mounted on the rotating drum 110 through a head drive unit 128. This level servo head 126L is mounted at the position an angle θ (90° in the present example) advanced from an index line 10 of the heads on the drum 110 and this head is driven in the axial direction of the rotating drum 110. The rotating drum 110 is coaxially fixed to a fixed head 130 for rotation around the axis, and the fixed head 130 is connected with a drum motor 132 for rotating the rotating drum 110 at a speed, for example, of 1800 r.p.m. On the top of the fixed head 130, there is provided a rotary transformer 124 for supplying the recording current to the heads. To the rotating drum 110, there is fixedly attached the head drive unit 128 for giving a vertical movement to the level servo head 126L. Both the level servo head 126L and the head drive unit 128 rotate at a constant speed, for example, of 1800 r.p.m. by means of the rotating operation of the drum motor 132. The head drive unit 128 is supplied with a head driving current through an electrode brush 134 and a slip ring 136.

Figures 3A, 3B:
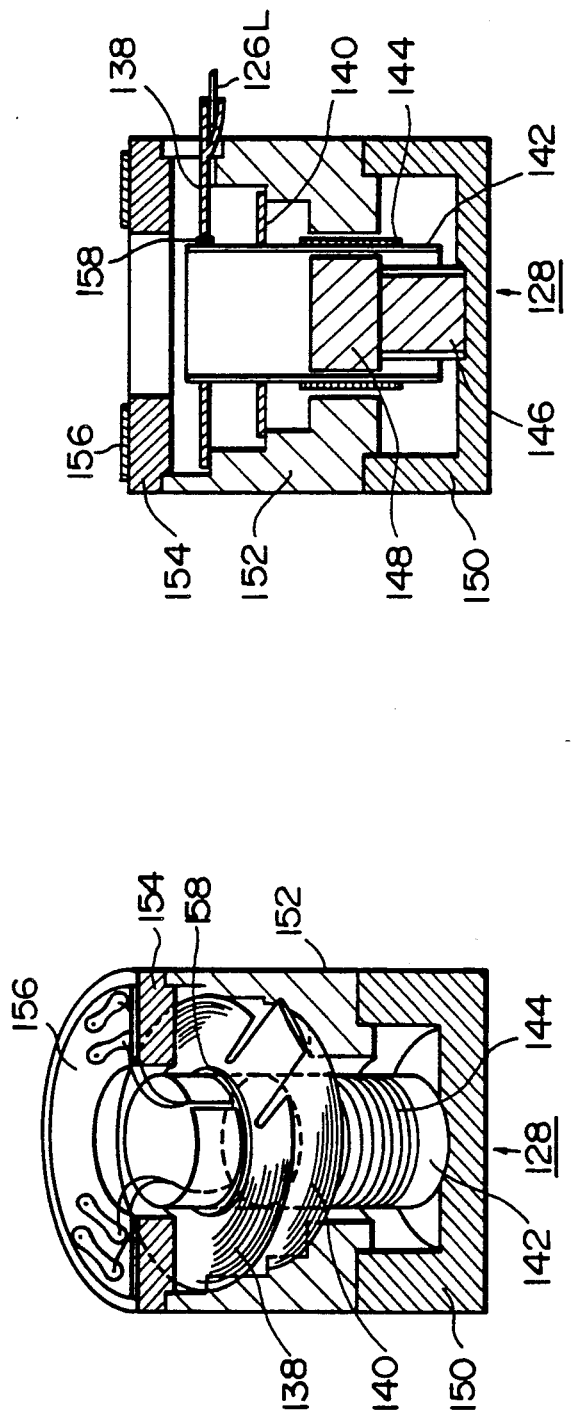

FIG. 3(a) is a partly sectional perspective view of the head drive unit 128 and FIG. 3(b) is a longitudinal sectional view of the same, in which the level servo head 126L is fixedly attached to one point on the circumference of one circular spring 138 of two circular springs 138 and 140. A hollow bobbin 142 is provided through the central portions, of and attached to, the circular springs 138, 140 and the hollow bobbin 142 is provided with a coil 144 wound around its periphery. On the interior of the hollow bobbin 142, there is disposed a permanent magnet 146 formed of rare earth cobalt and on the top of the permanent magnet 146, there is provided a pole piece 148 formed of soft iron. The bottom and side of the head drive unit 128 are formed into yokes 150 and 152 of soft iron, and above its cap 154, there is provided a print board 156 having a conducting pattern connected with the coil 144.

Figure 4A:
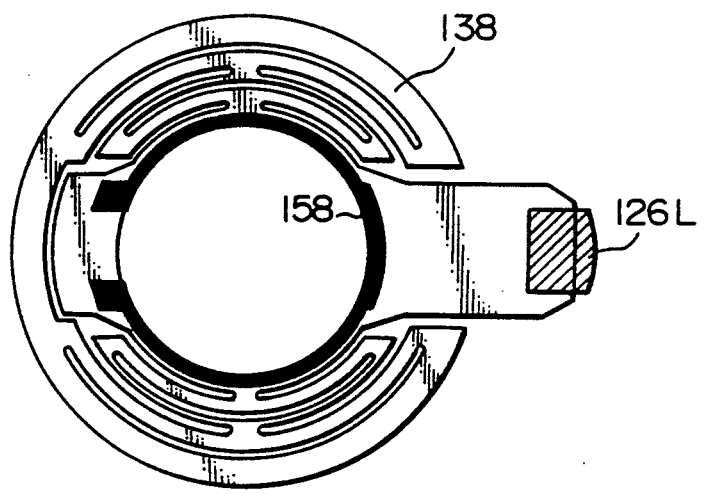
Figure 4B:
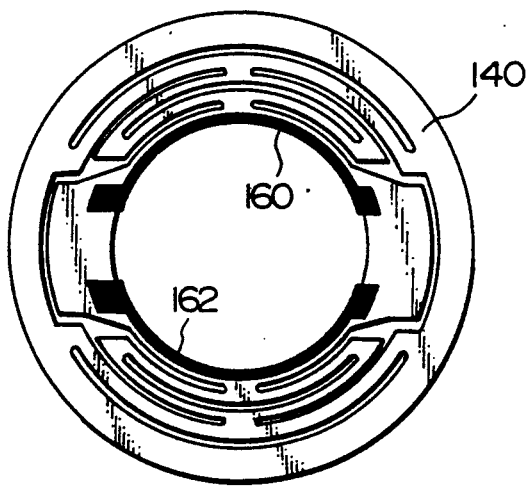

FIG. 4(a) and FIG. 4(b) are plan views showing detailed structure of the circular springs 138, 140. The two circular springs 138, 140 are each formed of a beryllium copper plate of a thickness of 0.08 mm and a number of slits are made in it so that it has stable resiliency. In the central portions of the two circular springs 138, 140, there are fixedly fitted spacers 158, 160, and 162 formed of moldings. Further, on the inner circumference of the spacers, there is attached the hollow bobbin 142 with a coil 144 wound around the same. Further, the level servo head 126L is fixedly attached to a point on the circumference of one circular spring 138. Thus, the head drive unit 128 is constructed by having the circular springs 138, 140 and the hollow bobbin 142 inserted in the yoke 152 with the circumferences of the circular springs 138, 140 fixedly attached to the yoke 152, such that the level servo head 126L is driven in the axial direction when the entire body of the hollow bobbin 142 is driven in the axial direction.

Figure 5:
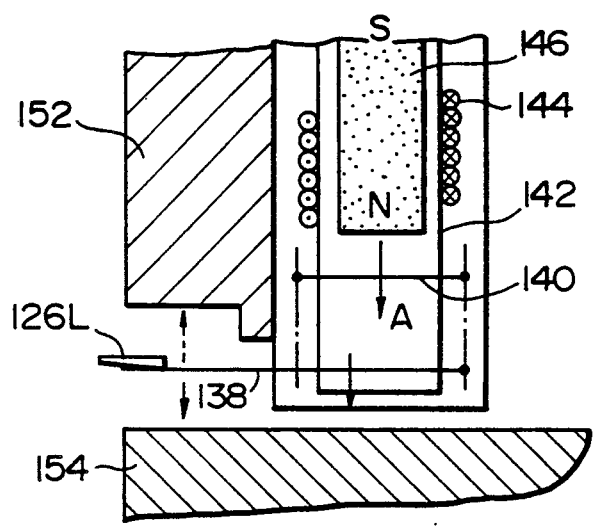
FIG. 5 is a sectional view for explaining operational principle of the head drive unit shown in FIG. 3, in which the relation between the driven movement of the hollow bobbin 142 with the coil 144 thereon and the oscillation of the level servo head is shown.

FIG. 5 is a sectional view for explaining operation of the head drive unit 128, in which the permanent magnet 146 is disposed with its N and S poles oriented as shown in the drawing. When a current is passed through the coil 144 in the direction as shown in the drawing (in a clockwise direction when the S pole of the permanent magnet 146 is viewed from the side of the N pole), a driving force in the direction as indicated by the arrow A is generated according to Fleming's left hand rule, to push down the hollow bobbin 142. At this time, since the circular springs 138 and 140 have soft, uniform resilience, though their circumferences are fixed to the yoke 152, the entire body of bobbin 142 moves downward in parallel with the axial line of the bobbin 142 itself, a distance proportional to the magnitude of the current. With the movement of the bobbin 142, the level servo head 126L attached to the circular spring 138 makes parallel translation downward.

In contrast with the above, if the direction of the current passed through the coil 144 is reversed, the bobbin 142 makes an upward movement. Since the level servo head 126L makes vertical translation parallel to the axis of the rotating drum 110 in the described manner, with the magnetic tape and the entire head surface of the level servo head 126L constantly kept in abutment, the FM signal can be picked up from the magnetic tape to a maximum while the magnetic tape is not injured by the level servo head 126L with the edge of its head surface.

Figure 6:
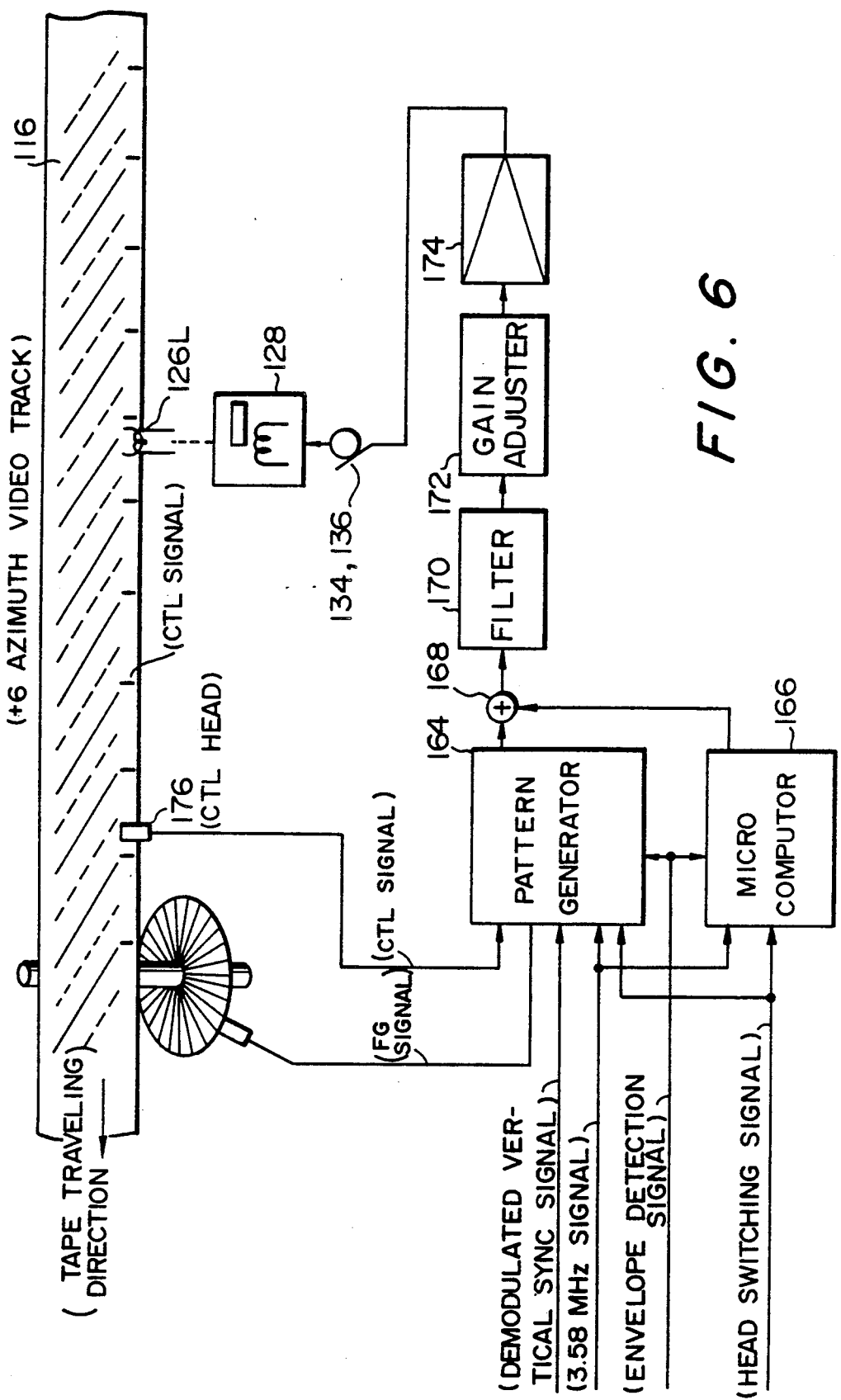
FIG. 6 is circuit diagram showing a drive circuit for controlling the position of the level servo head by means of the head drive unit 128.

FIG. 6 is a block circuit diagram of the driving system of the level servo head according to the present embodiment.

The driving system of the level servo head 126L comprises a pattern generator 164 and a microcomputer 166 for calculating the amount of movement of the level servo head 126L based on an envelope detection signal of the play back signal obtained by means of the level servo head 126L, a capstan frequency generator (FG) signal, and a control (CTL) signal, an adder 168 for supplying the coil 144 with a head driving current according to the calculated amount of movement, a filter 170, a gain adjuster 172, and a current amplifier 174. More particularly, the position of the rotating plane of the level servo head 126L is detected based on the CTL signal picked up by a CTL head 176 and the FG signal substantially dividing the positions of the rotating plane of the level servo head 126L relative to the video track. When the playback speed of the magnetic tape 116 is faster than the reference speed, a control current is supplied to the coil 144 to move down the level servo head 126L lower than its standard position at the time of the standard speed. Further, when the playback speed is slower than the reference speed, a control current is supplied to the coil 144 to move up the level servo head 126L higher than the standard head position.

With the described arrangement, the position of the level servo head 126L relative to the video track at any tape travelling speed can be calculated. By compensating for this, it is made possible to have one field period scanned accurately.

Figure 7:
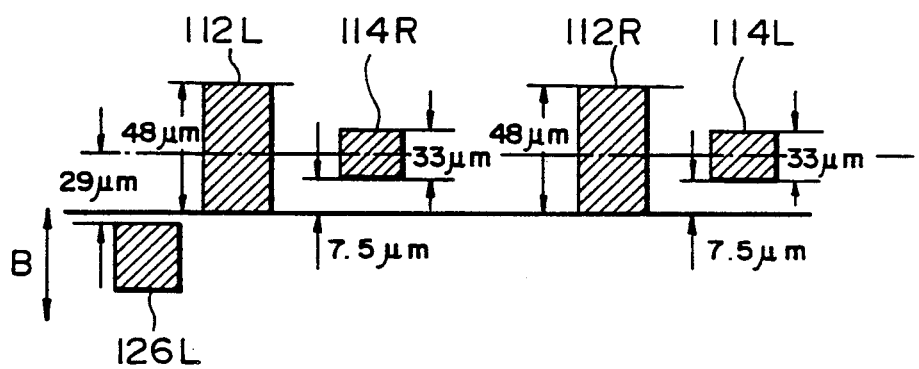
FIG. 7 is a relative positional drawing showing the arrangement of the level servo head 126L offset from other heads 112L, 112R, 114L, and 114R, in which the offset determined according to an angle θ of the level servo head 126L shifted from the other heads 112L, 112R, 114L, and 114R, and an oscillating width B of the level servo head by means of the head drive unit 128 are shown.

FIG. 7 is a drawing showing offset arrangement of the level servo head 126L in the present embodiment relative to the heads 112L, 114R, 112R, and 114L, in which the offset is calculated based on the angle in FIG. 1 by $$\text{video track width} \times \left( \frac{180 - \theta°}{180°} \right) \mu m.$$

Supposing now, in a VTR of the VHS system, that the level servo head 126L is disposed at the position of the angle $\theta = 90$, the offset becomes $$58 \, \mu m \left( \frac{180 - 90°}{180°} \right) = 29 \, \mu m.$$

and, referenced from this position, the level servo head 126L is driven ten-odd $\mu m$ vertically (in the directions indicated by B) by means of the head drive unit 128.

Figure 8A:
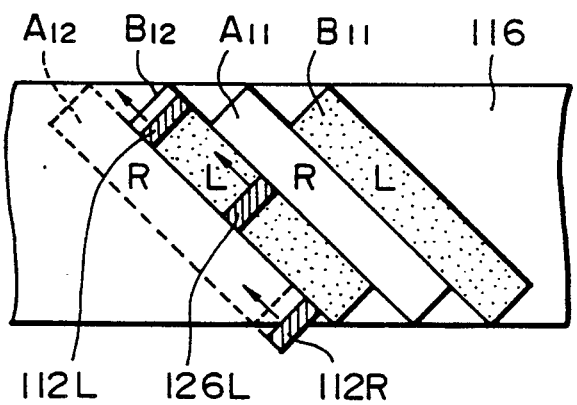
FIGS. 8(a) and 8(b) are relative positional drawings showing the scanning along the track on the magnetic tape 116 performed by the level servo head 126L characteristic of the present invention

The locus of the level servo head 126L being offset a predetermined distance as described above becomes as shown in FIGS. 8(a) and 8(b). First, referring to FIG. 8(a), the relative positions of the heads when the head 112R has just jumped in from the supply side of the rotating drum 110 and is on the point of starting recording along the track $A_{12}$ are considered. At this time, the head 112L is just on the point of finishing recording along the track $B_{12}$ and is about to jump out to the takeup side of the rotating drum 110. Then, the level servo head 126L being in the playback mode is at the position scanning the portion virtually in the center of the track $B_{12}$. Thus, it scans the track $B_{12}$ faithfully driven by the head drive unit 128 and plays back the signal recorded along the track $B_{12}$.

Figure 8B:
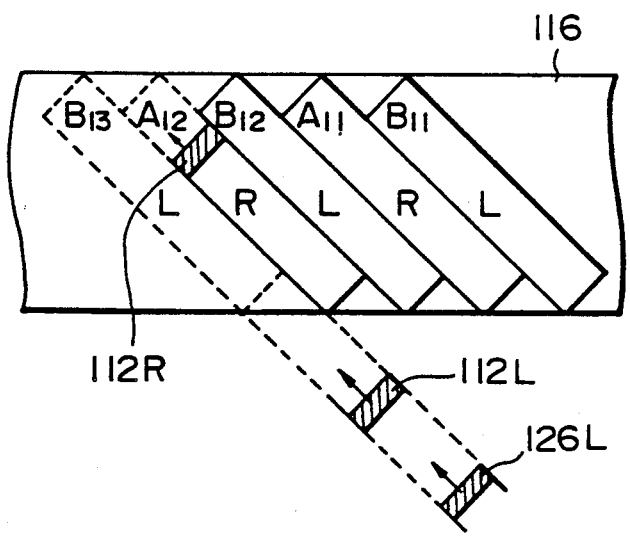

FIG. 8(b) shows the relative positions when the head 112L is about to finish recording along the video track $A_{12}$. At this timing, the head 112L is located on the extension of the next track $B_{13}$ and the level servo head 126L is at the position following after the head 112L. Hence, both the heads 112L and 126L are not in contact with the magnetic tape 116.

FIG. 9 shows a circuit diagram of the recording/playback system of the present embodiment, in which gain control amplifiers 120, 121 to which an FM video signal is input, are serially connected with recording power amplifiers 122, 123 and a rotary transformer 124. To one end of the rotary transformer 124 are connected recording/playback mode selecting switches 178a–178d for switching between recording/playback modes and head amplifiers 180a–180d for amplifying the outputs of the rotary transformer 124. Meanwhile, to the level servo head 126L characteristics of the present invention is connected a playback FM envelope amplitude detector 182 (hereinafter to be referred to as "detector") through the rotary transformer 124 and a head amplifier 180e. The detector 182 is connected to the gain control amplifiers 120, 121 and constitutes a feedback loop for controlling the recording current for the record signal.

Operation of the circuit of the recording/playback system shown in FIG. 9 will be described below.

First, the recording operation in a standard mode will be described. Here, it is assumed that the gain control amplifiers 120, 121 are set to the gain specified for a standard tape. At this time, the recording/playback mode selecting switch 178c, 178d are set to recording mode (switched ON) and the head amplifiers 180c, 180d are grounded on their input sides. Thereby, one end of the winding of the rotary transformer 124 on the side of the switch 178, i.e., the winding on the fixed side, is grounded and the recording current is supplied from the power amplifier 123 to the heads 112L and 112R. Thus, a signal is recorded on the magnetic tape 116 by the heads 112L, 112R.

In this case, if the magnetic tape 116 mounted on the apparatus is the standard tape related with the setting of the recording current, the playback output level of the heads 112L, 112R is maximized and the S/N ratio is enhanced so that a playback picture of high quality is obtained and the output level of the level servo head 126L is also maximized. But, if a magnetic tape 116 of different characteristics from the standard tape is loaded, or when the head 112L is worn out and the gap is made shallow, the optimum recording current $I_{REC}$ becomes different from the initially set recording current.

Then, the playback output signals from the level servo head 126L is taken out through the rotary transformer 124 and amplified by means of the head amplifier 180e, the amplitude level of the amplified signal is detected and amplified in the FM envelope amplitude detector 182, and the amplified signal is fed back to the gain control amplifiers 120, 121 so that the gain of the amplifiers 120 and 121 are controlled. That is, when the playback level of the level servo head 126L is low, the recording current of the heads 112L, 112R is increased by raising the gain of the gain control amplifiers 120, 121 so that the playback level may be maximized.

Although the operation described above was that in the standard mode, the operation in the triple speed mode is the same. In this case, recording current for the heads 114L, 114R for the triple speed mode is controlled.

At the time of playback, the switch 184 is operated and the playback operation is performed by the heads 112R, 112L, 114R, and 114L and the head amplifiers 180a, 180b, 180c and 180d, while the operation of the head drive unit 128 and the playback operation of the level servo head 126L are stopped.

According to the VTR of the first embodiment arranged as described above, the following effects can be obtained:

(1) The recording current is controlled to agree with the optimum recording current $I_{REC}$ at all times by means of the level servo head 126L and the FM envelope amplitude detector 182. Hence, even if the value of the optimum recording current $I_{REC}$ is changed depending on the kind of the magnetic tape 116 or due to conditions of wear of the heads 112L or 114L, automatic adjustment of the recording current and improvement of the S/N ratio can be achieved. Also, such control is performed easily by controlling the gain of the gain control amplifiers 120, 121.

(2) Due to the fact that the level servo head 126L is positioned a predetermined angle $\theta$ apart from the index line $l_0$ and disposed with an offset corresponding to the angle $\theta$, it is made possible for the level servo head 126L to scan the track along which an FM video signal has been recorded to thereby play back the recorded signal.

(3) By operation of the switch 184, it is made possible for the level servo head 126L to control the recording current in a plurality of operating modes (standard mode, triple speed mode).

(4) Since the position of the level servo head 126L in the axial direction is adapted to be finely adjusted by means of the head drive unit 128, it is made possible for the level servo head 126L to make the scanning more accurately. Thus, the playback error in the level servo head 126L is reduced and the control of the recording current can be performed more effectively.

(5) By such arrangement that the level servo head 126L is supported by a circular spring 138 in the head drive unit 128, the hollow bobbin fixedly attached to the circular spring 138 and another circular spring 140 is driven, and the current for driving the bobbin, i.e, the current for driving the head, is determined by calculation dependent on the CTL signal and the FG signal. Thus, fine adjustments of the position of the level servo head 126L can be automatically performed.

(6) It is made possible to check the optimum recording current $I_{REC}$ of the magnetic tape 116 and the degree of the wear of the head 112L or 114L.

In the above described embodiment, it is also possible to use two or more circular springs 140 provided that the material has good resiliency and is highly reliable.

Although the circular springs 138, 140 were provided therein with a number of slits in the above embodiment, the structure is not limited to that but the slits may be provided radially or the thickness of the spring may be varied.

Although two circular springs 138, 140 were used in the above embodiment to thereby keep the bobbin 142 in parallel with the rotating axis, three or more springs may be used. Alternatively, it may be possible in principle to obtain the parallelism by having one side of the bobbin 142 supported by a slidably supporting member and the other end supported by one circular spring 138. Further, the coil 144 was provided on one side of the bobbin 142 in the above embodiment, the coil 144 may, for example, be provided on the bobbin 142 at its central portion since the two circular springs are preferred to be apart from each other as much as possible.

Figure 10:
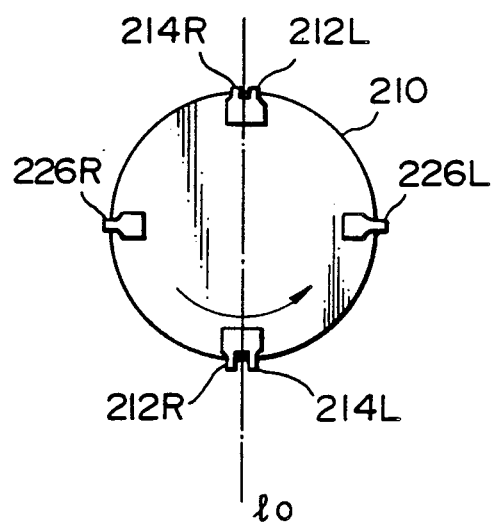
FIG. 10 is a plan view showing arrangement of heads on a rotating drum in a VTR according to a second embodiment of the present invention, in which two pieces of the level servo heads 226 characteristic of the present invention, i.e., 226L and 226R, are disposed on the periphery of the rotating drum 210 so as to confront two tracks corresponding to two recording channels.

A head arrangement according to a second embodiment of the present invention is shown in FIG. 10. In this embodiment, there are provided heads 212L, 212R for the standard mode, heads 214L, 214R for the triple speed mode, and an L-azimuth level servo head 226L the same as in the first embodiment. However, in addition thereto, there is provided an R-azimuth level servo head 226R at the position symmetrical with the L-azimuth level servo head 226L about the axis of the rotating drum 210.

Since, in this embodiment, two level servo heads 226L and 226R corresponding to two, left and right, channels are provided for playing back signals for controlling the recording current values, such an effect can be obtained that optimization of the recording current for each channel is achieved in addition to the effects that are obtained in the first embodiment.

Figure 11:
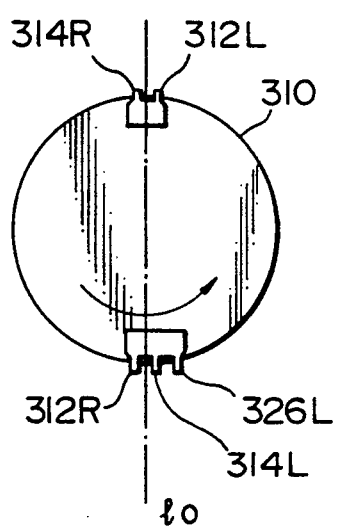
FIG. 11 is a plan view showing arrangement of heads on a rotating drum in a VTR according to a third embodiment of the present invention, in which a level servo head 326L characteristic of the present invention is provided on the same base as that for conventional heads 312R and 314L, thus forming combined multi-heads.
Figure 12:
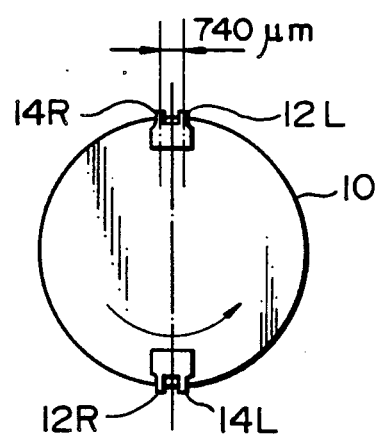
FIG. 12 is plan view showing arrangement of heads on a rotating drum in a prior art VTR, in which heads 12L and 12R are disposed symmetrically with heads 14L and 14R about the axis of the rotating drum 10 on the periphery of the rotating drum 10.
Figure 13:
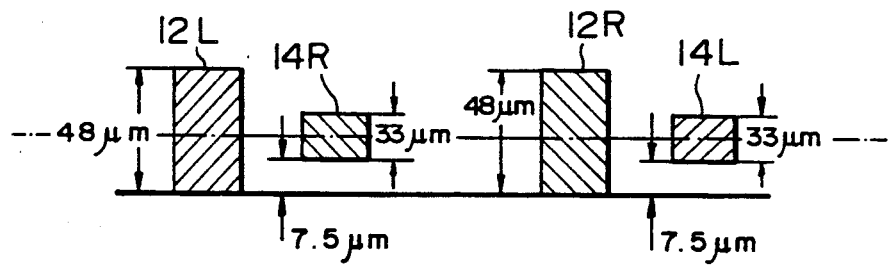
FIG. 13 is a relative positional drawing of the heads 12L, 12R, 14L, and 14R shown in FIG. 12, in which so-called alignment is provided for the heads, that is, the heads 12L, 12R, 14L, and 14R are set in the one-dot chain line.
Figure 14:
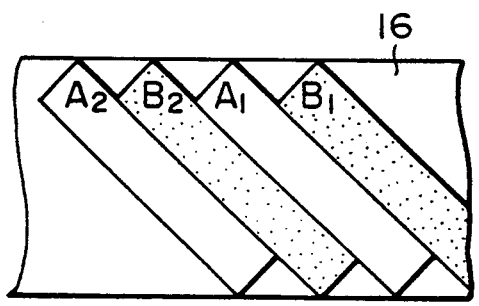
FIG. 14 is a pattern diagram showing track patterns at the time of recording in a standard mode in the prior art example shown in FIG. 13.
Figure 15:
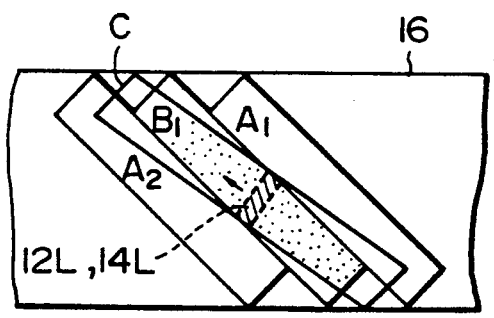
FIG. 15 is a relative positional drawing showing position of a head at the time of still picture playback in the prior art example shown in FIG. 13.
Figure 16:
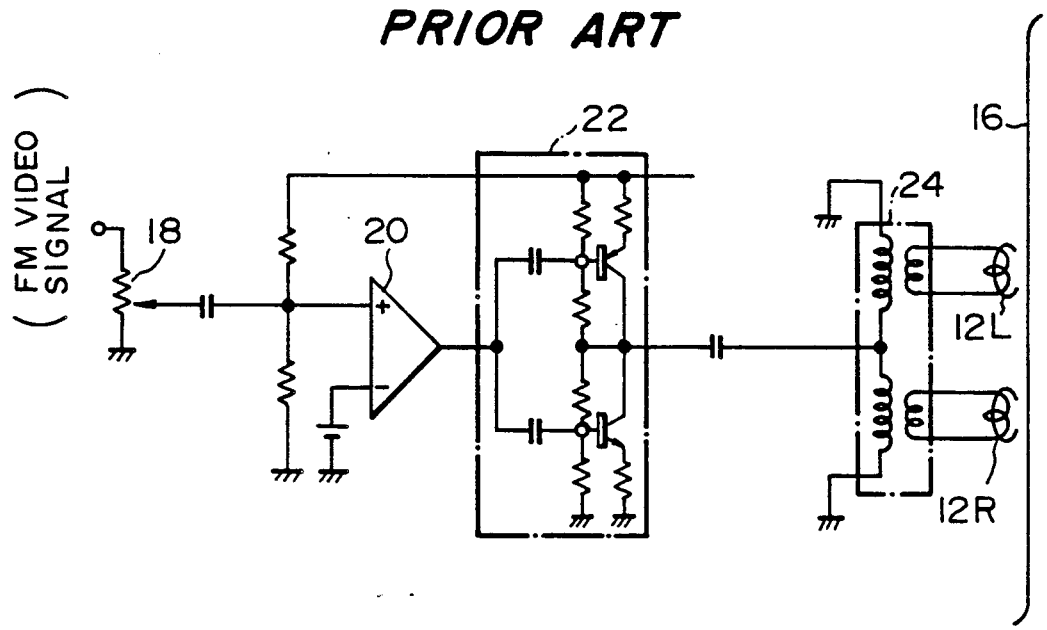
FIG. 16 is a circuit diagram showing a circuit of the recording system in the prior art VTR.
Figure 17:
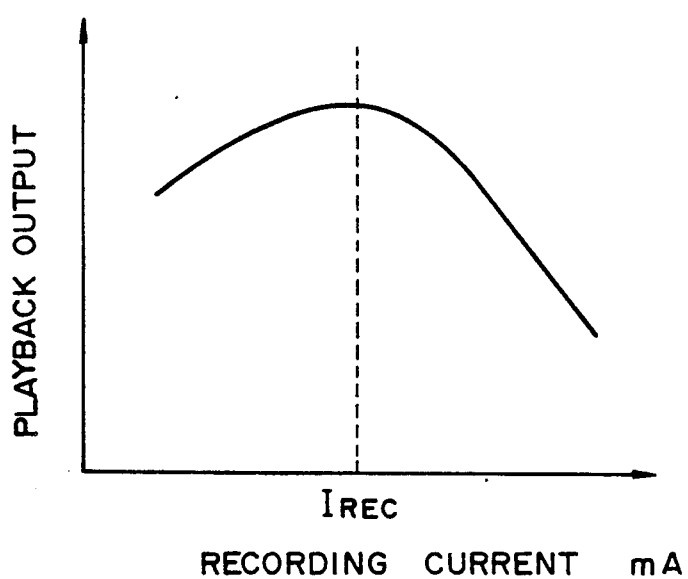
FIG. 17 is a characteristic curve of playback output obtained by the recording current supplied to the circuit of the recording system shown in FIG. 16, in which a curve with a peak of the playback output is shown and the optimum current value corresponding to the peak is indicated as $I_{REC}$.

In FIG. 11 is shown a head arrangement according to a third embodiment of the present invention. In this embodiment, the L-azimuth level servo head 326L is formed integral with heads 312R and 314L.

Also in this embodiment, similar effects to those obtained in the first embodiment can be obtained. Further, thereto, the need for deciding designing conditions as to the disposed position of the level servo head can be eliminated an intensification of the function of the head assembly can be attained.

What is claimed is:

1. An apparatus for magnetic recording and playback including video heads for making an FM magnetic recording along tracks on a magnetic tape and including a cylindrical rotating drum with the video heads peripherally disposed and rotating around the axis thereof, inclined at a predetermined angle with a travelling direction of the magnetic tape such that the video heads scan the tracks on the magnetic tape, the apparatus comprising:

a level servo head disposed on the periphery of said cylindrical rotating drum for scanning, while magnetic recording along a track is performed by a video head, the track along which the magnetic recording has been performed, to thereby produce a playback signal from the magnetic recording; and recording current controlling means, responsive to a level of the playback signal produced by said level servo head, for detecting a level of the playback signal and for automatically controlling recording current value based upon the detected level, such that playback signal level is maximized, said recording current controlling means automatically controlling gain of recording amplifiers by automatically adjusting amplification of the recording current and supplying the amplified recording current to at least one of said video heads, said gain being automatically controlled dependent on the level of the playback signal produced by said level servo head, whereby said magnetic recording is performed to maximize FM signal level when the FM signal is played back.

2. An apparatus for magnetic recording and playback according to claim 1, wherein said level servo head is formed integral with said video heads.

3. An apparatus for magnetic recording and playback according to claim 1, wherein said level servo head is disposed at a position offset a predetermined distance from said video heads in an axial direction of said rotating drum.

4. An apparatus for magnetic recording and playback according to claim 3, wherein a head drive unit is provided for minutely adjusting the position of said level servo head where the level servo head confronts the magnetic tape in the axial direction of said rotating drum, dependent upon travelling speed of the magnetic tape.

5. An apparatus for magnetic recording and playback according to claim 3, wherein said level servo head is disposed at a position shifted a predetermined angle from said video heads along a circumference of said rotating drum, said predetermined angle being of an amount determined corresponding to the offset of said level servo head from said video heads.

6. An apparatus for magnetic recording and playback according to claim 5, wherein a plurality of level servo heads are provided so as to respectively confront plural tracks forming plural recording channels.

7. An apparatus for magnetic recording and playback according to claim 5, wherein a head drive unit is provided for minutely adjusting the position of said level servo head where the level servo head confronts the magnetic tape in the axial direction of said rotating drum, dependent upon travelling speed of the magnetic tape.

8. An apparatus for magnetic recording and playback according to claim 7, wherein said head drive unit includes:

a support spring for supporting said level servo head for oscillation; and a head driving actuator for driving said support spring in the axial direction of the rotating drum by means of a moving member supported by said support spring and a fixed member fixed to a frame of said head drive unit, to thereby minutely adjust the position of said level servo head in the axial direction of said rotating drum dependent upon travelling speed of the magnetic tape.

9. An apparatus for magnetic recording and playback according to claim 8, wherein said support spring is a circular spring in a disk form with slits made therein and a plurality of the circular springs are provided for supporting the movable member of said head drive unit.

10. An apparatus for magnetic recording and playback according to claim 9, wherein a position of said level servo head in relation to said magnetic tape is detected and is controlled by head position controlling means for driving said head driving actuator depending on said detected position of said level servo head.

11. An apparatus for magnetic recording and playback according to claim 5, wherein a plurality of level servo heads are provided corresponding to a plurality of said video heads corresponding to plural recording modes of the apparatus.

12. An apparatus for magnetic recording and playback according to claim 11, wherein a head drive unit is provided for minutely adjusting the position of said level servo head where the level servo head confronts the magnetic tape in the axial direction of said rotating drum, dependent upon travelling speed of the magnetic tape.

13. An apparatus for magnetic recording and playback according to claim 12, wherein said head drive unit includes:

a support spring for supporting said level servo head for oscillation; and a head driving actuator for driving said support spring in the axial direction of the rotating drum by means of a moving member supported by said support spring and a fixed member fixed to a frame of said head drive unit, to thereby minutely adjust the position of said level servo head in the axial direction of said rotating drum dependent upon travelling speed of the magnetic tape.

14. An apparatus for magnetic recording and playback according to claim 13, wherein said support spring is a circular spring in a disk form with slits made therein and a plurality of the circular springs are provided for supporting the movable member of said head drive unit.

15. An apparatus for magnetic recording and playback according to claim 14, wherein a position of said level servo head in relation to said magnetic tape is detected and is controlled by head position controlling means for driving said head driving actuator depending on said detected position of said level servo head.

* * * * *